(12) United States Patent
Mortier

(10) Patent No.: US 9,176,872 B2
(45) Date of Patent: Nov. 3, 2015

(54) WAIT-FREE ALGORITHM FOR INTER-CORE, INTER-PROCESS, OR INTER-TASK COMMUNICATION

(71) Applicant: BARCO N.V., Belgium (BE)

(72) Inventor: Peter Mortier, Hulst (NL)

(73) Assignee: Barco N.V. (BE)

( * ) Notice: Subject to any disclaimer, the term of this patent is extended or adjusted under 35 U.S.C. 154(b) by 423 days.

(21) Appl. No.: 13/775,305

(22) Filed: Feb. 25, 2013

(65) Prior Publication Data

US 2014/0244944 A1 Aug. 28, 2014

(51) Int. Cl.
*G06F 13/00* (2006.01)
*G06F 12/02* (2006.01)
*G06F 9/54* (2006.01)

(52) U.S. Cl.
CPC ............ *G06F 12/0284* (2013.01); *G06F 9/544* (2013.01)

(58) Field of Classification Search
CPC ...... G06F 9/544; G06F 12/0813; H04L 49/90
USPC .............................. 719/312; 711/147; 710/56
See application file for complete search history.

(56) References Cited

U.S. PATENT DOCUMENTS

| | | | |
|---|---|---|---|
| 5,867,656 A | 2/1999 | Iwasaki et al. | |
| 6,100,906 A | 8/2000 | Asaro et al. | |
| 6,223,335 B1 | 4/2001 | Cartwright, Jr. | |
| 6,356,938 B1 | 3/2002 | Munoz et al. | |
| 7,620,753 B1* | 11/2009 | Beaman et al. | 710/56 |
| 8,904,067 B2* | 12/2014 | Saputra | 710/56 |
| 2002/0112100 A1 | 8/2002 | Zimmerman et al. | |
| 2002/0144003 A1 | 10/2002 | Jin | |
| 2009/0204755 A1 | 8/2009 | Rushworth et al. | |
| 2010/0007673 A1 | 1/2010 | Swic | |
| 2010/0242051 A1* | 9/2010 | Roettger et al. | 719/312 |

OTHER PUBLICATIONS

International Search Report and Written Opinion dated Jul. 7, 2014 for corresponding International application No. PCT/EP2014/053497.
Liu, Tongping, Charlie Curtsinger, and Emery D. Berger. "Dthreads: efficient deterministic multithreading." Proceedings of the Twenty-Third ACM Symposium on Operating Systems Principles. ACM, 2011.

* cited by examiner

*Primary Examiner* — Andy Ho
(74) *Attorney, Agent, or Firm* — Renner, Otto, Boisselle and Sklar, LLP

(57) ABSTRACT

A method and system are presented for providing deterministic inter-core, inter-process, and inter-thread communication between a reader and a writer. The reader and writer communicate by passing data through a shared memory using double buffering of double buffers. The shared memory includes a first double buffer and a second double buffer. Both double buffers include a first low level buffer and a second low level buffer. Using double buffering of the double buffers, both the reader and the writer may simultaneously access the shared memory.

22 Claims, 12 Drawing Sheets

FIG. 1
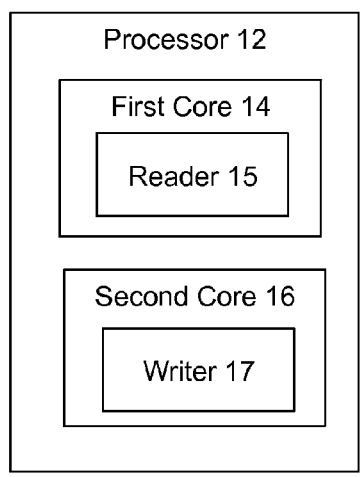
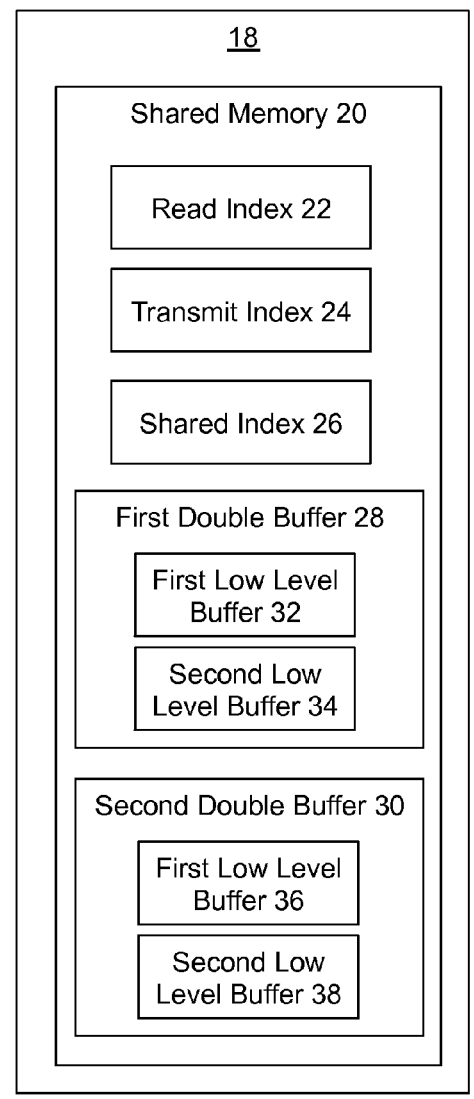

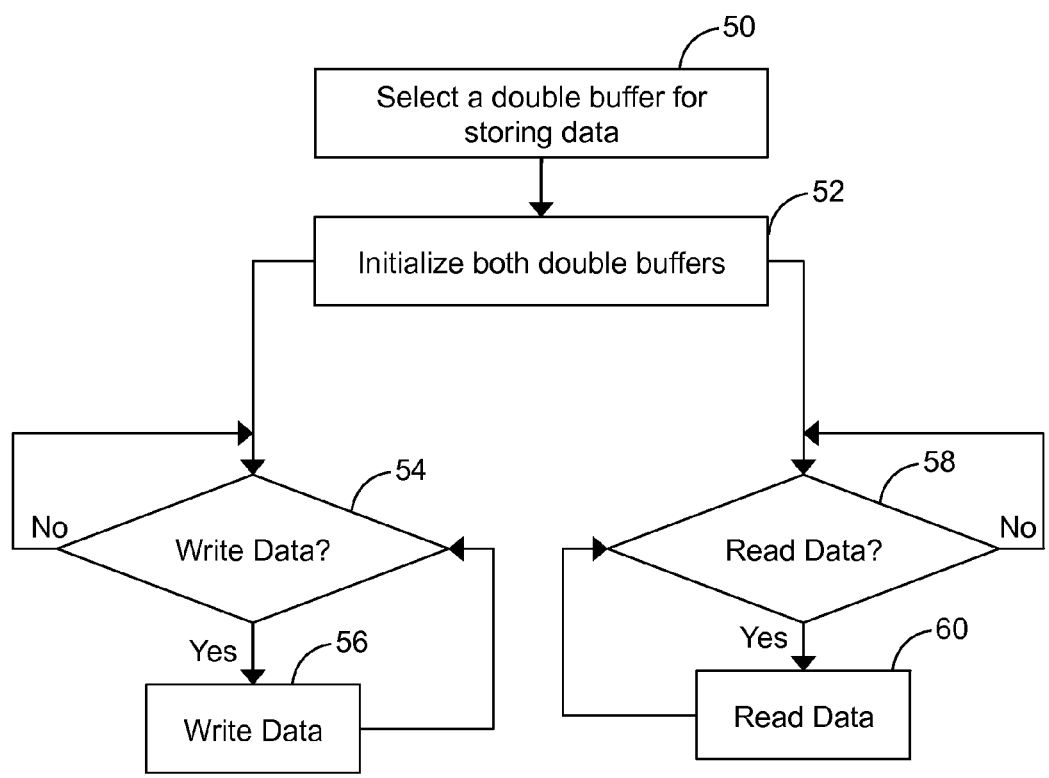

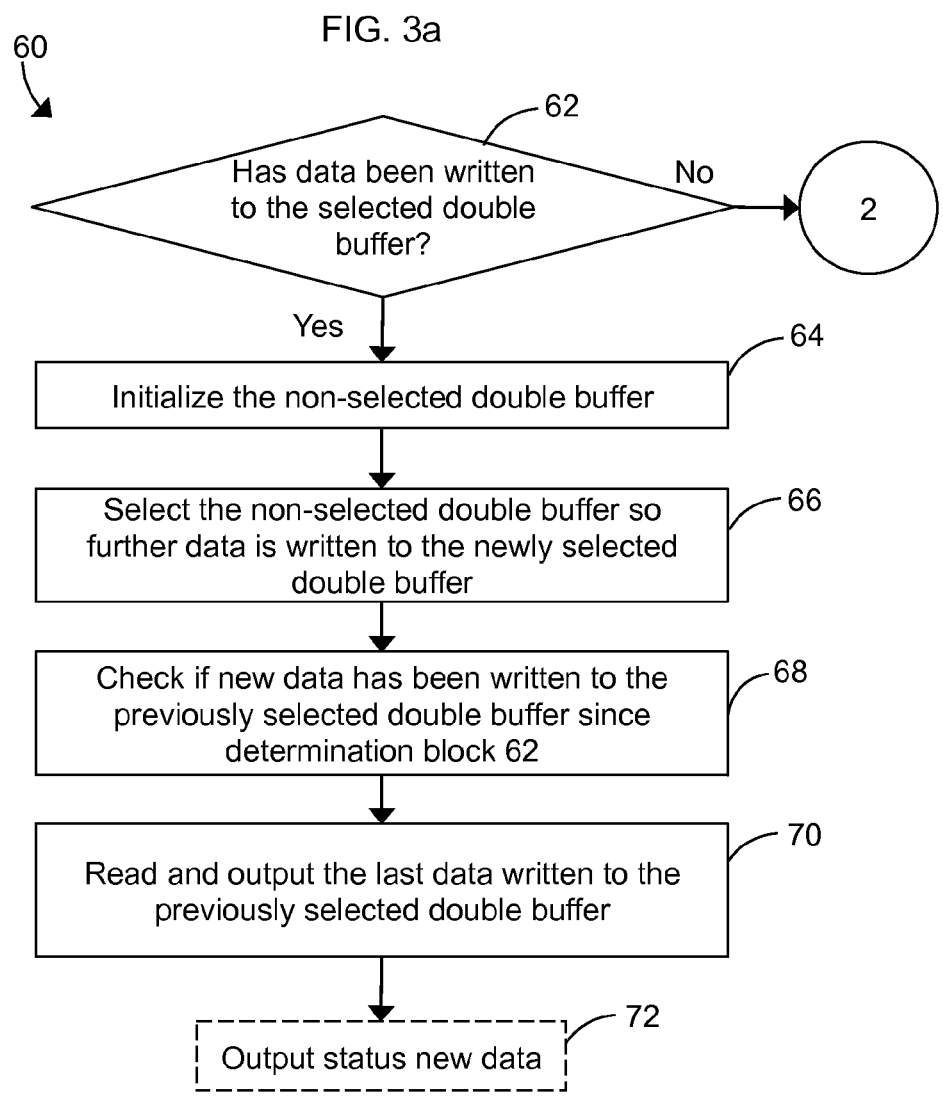

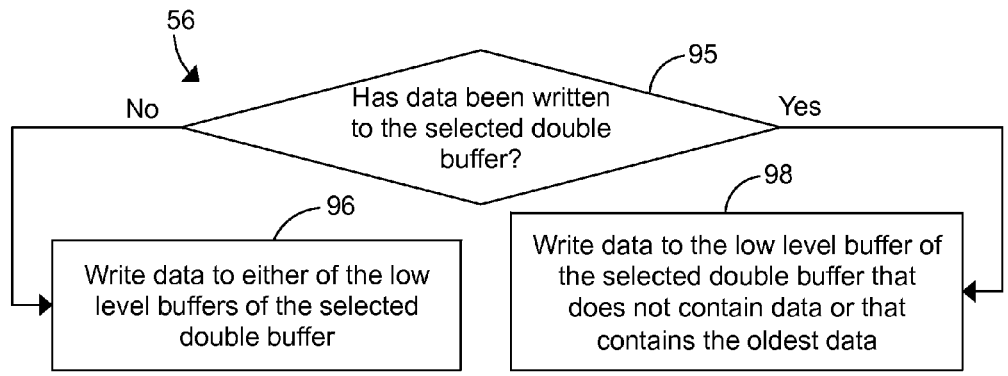
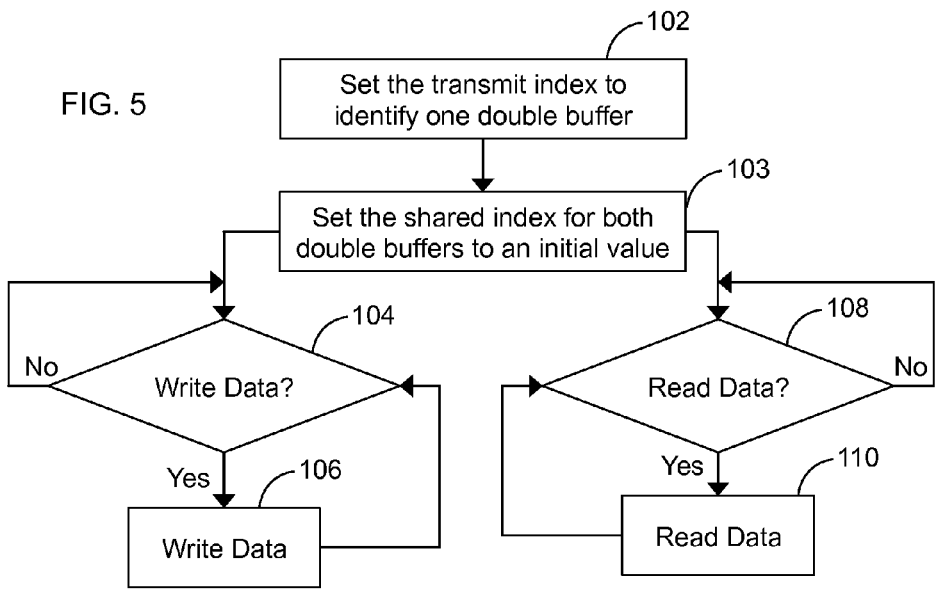

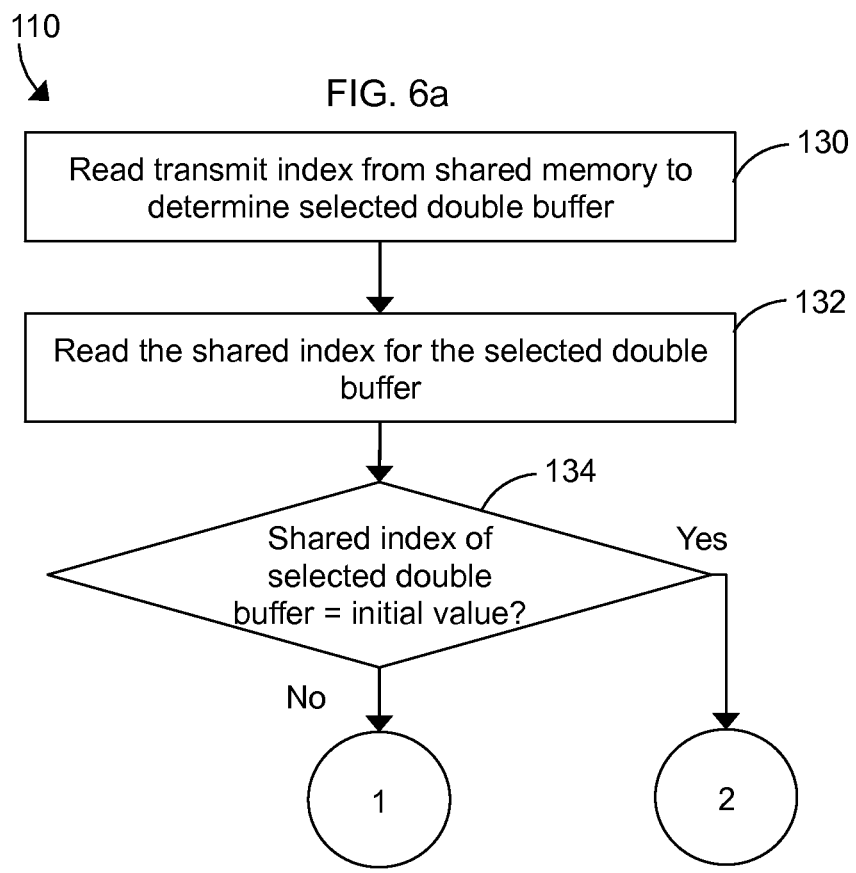

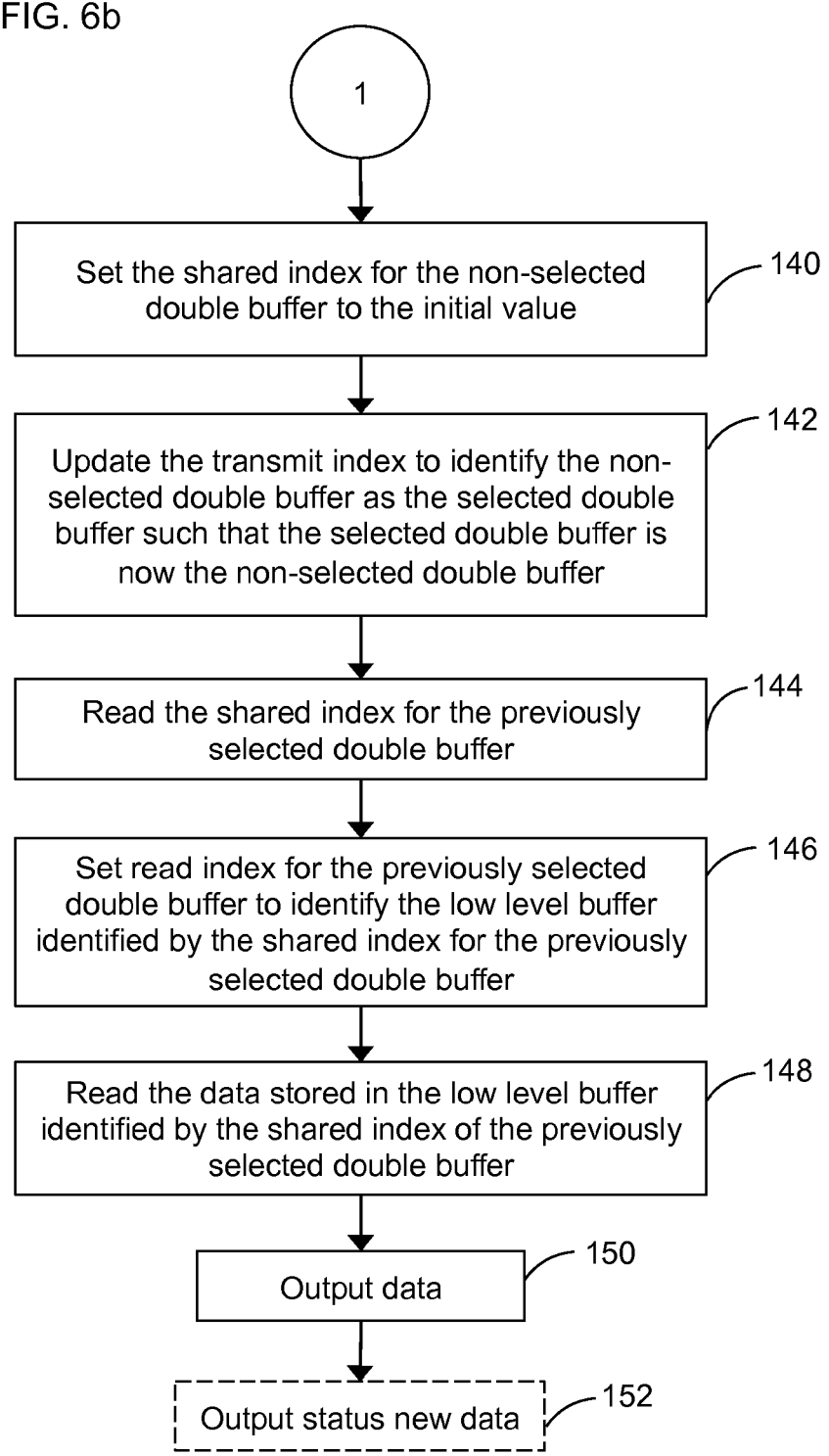

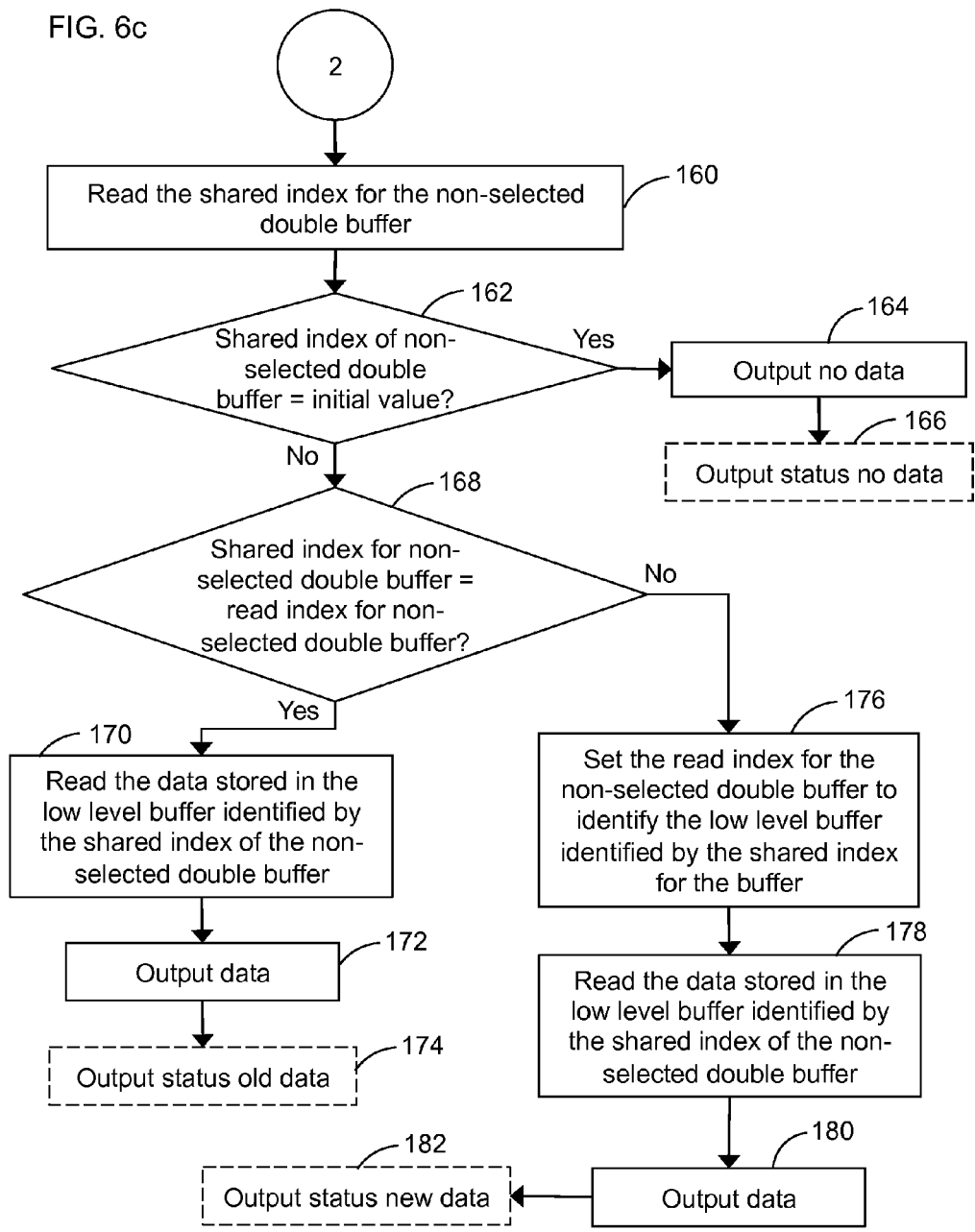

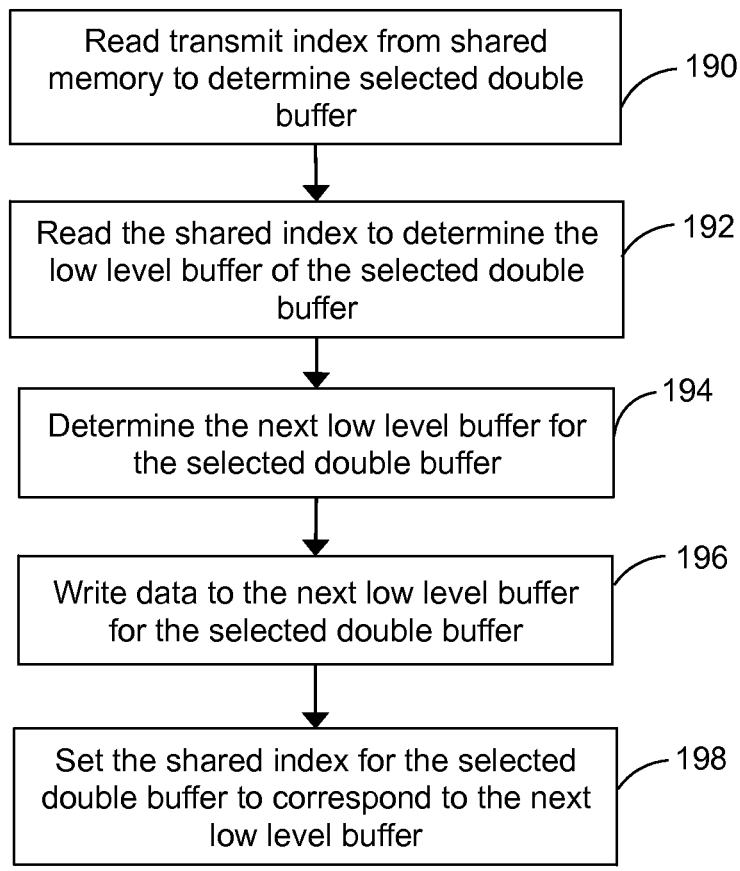

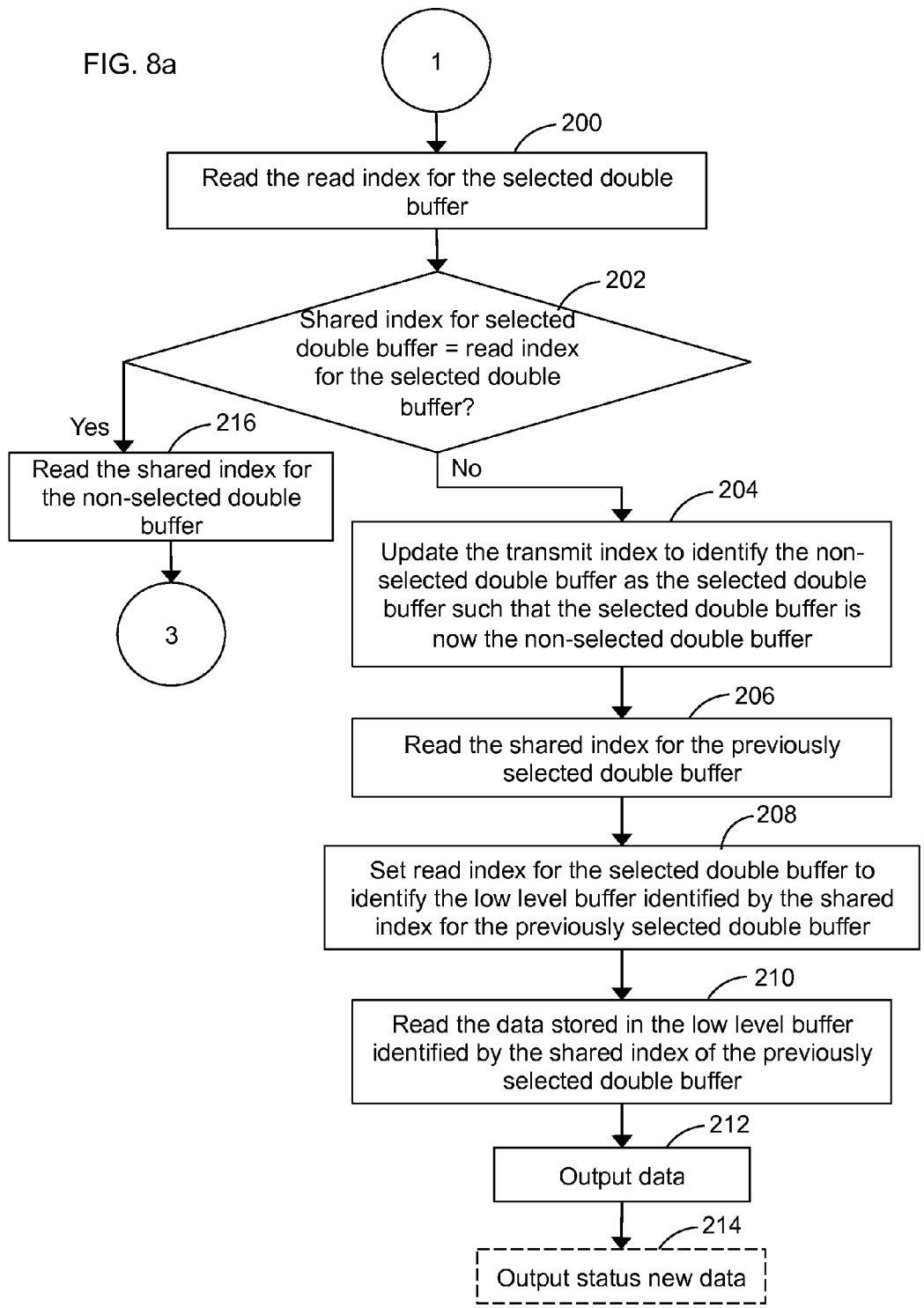

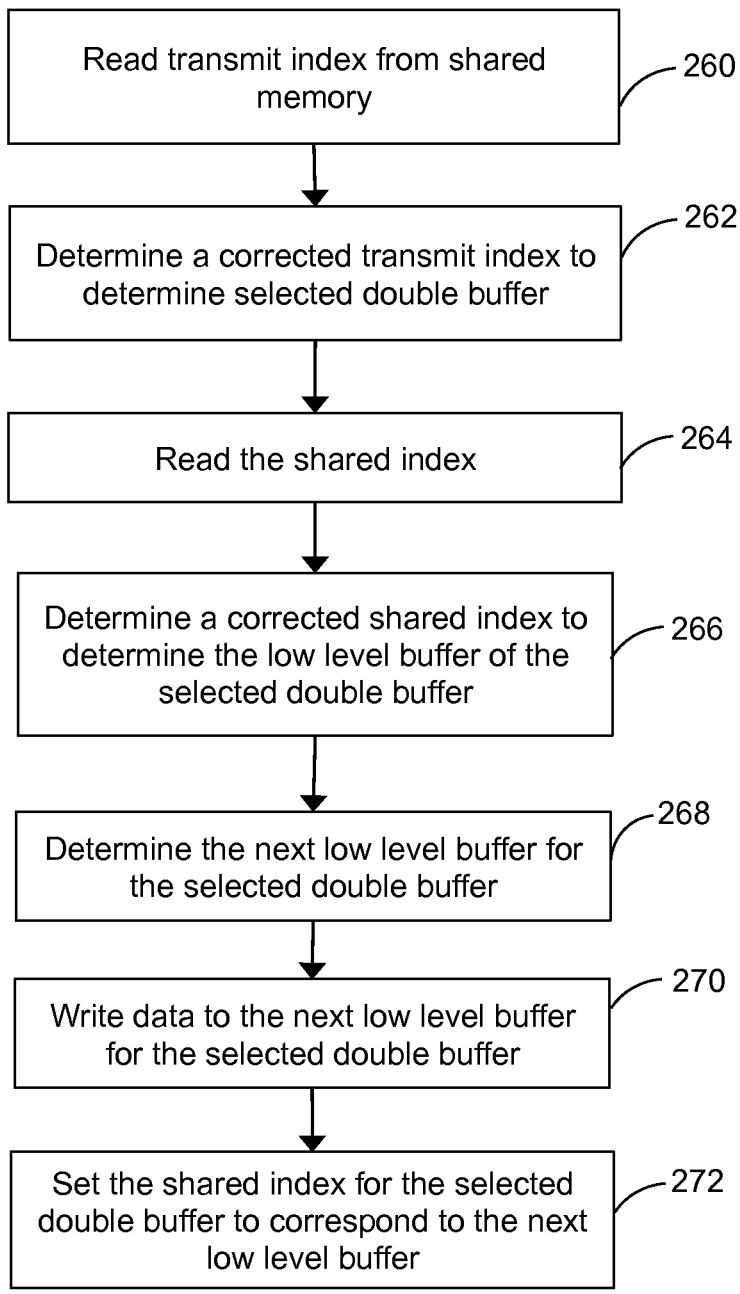

WAIT-FREE ALGORITHM FOR INTER-CORE, INTER-PROCESS, OR INTER-TASK COMMUNICATION

TECHNICAL FIELD

The present invention relates generally to multi-core computer systems, and particularly to methods for communicating and sharing data between cores, processes, or threads.

BACKGROUND

The need for more powerful processing platforms in the avionics industry and the availability of multi-core devices has resulted in the development of avionics processing platforms utilizing multi-core devices. However, before multi-core devices can be utilized in avionics processing platforms, testing should be performed to ensure that the operation of each multi-core device complies with required regulations. For example, it may be a requirement that a display is updated every 50 ms. Before a multi-core device can be utilized, it should be shown to comply with this requirement.

In order to ensure that a multi-core device complies with required regulations, multi-core devices should be able to pass data between cores, processes and threads in a wait-free manner. There should also be no interference between applications running on the multi-core device. That is, each application should be partitioned in memory and time space, such that memory and timing are not affected by the execution of other applications.

Current deterministic solutions for multi-core communication can be divided into blocking and non-blocking algorithms. Blocking algorithms are non-ideal, as threads/cores compete for shared resources and, due to mutual exclusion, can have their execution postponed indefinitely. Current, conventional non-blocking algorithms predominately use atomic read-modify-write primitives that should be provided by the underlying hardware components. Additionally, non-blocking algorithms may require a writer to wait for a reader to complete reading data from a shared resource before the writer is permitted to write data to the shared resource. That is, current non-blocking algorithms may not allow a reader to simultaneously read data from a shared resource as a writer writes data to the shared resource.

SUMMARY

A system and method is proposed for providing deterministic inter-core, inter-process, and inter-thread communication between a reader and a writer by passing data through shared memory using double buffering of double buffers. A system and method according to the invention enables one or more advantages to be obtained, including allowing, in a deterministic manner, a reader to simultaneously read data from a shared resource as a writer writes data to the shared resource.

According to one aspect of the disclosure, a method for providing deterministic inter-core, inter-process, and inter-thread communication between a reader and a writer by passing data through shared memory using double buffering of double buffers includes the reader or writer selecting one of a first double buffer or a second double buffer as a selected double buffer. The writer writes data to the selected double buffer, each double buffer is stored in the shared memory, and each double buffer includes a first low level buffer and a second low level buffer. The method additionally includes the reader reading data. Reading data includes the reader determining if new data has been written to the selected double buffer. New data corresponds to data that has not been read by the reader. If new data has been written to the selected double buffer, the reader selects the non-selected double buffer as the selected double buffer such that the writer writes data to the newly selected double buffer. If new data has been written to the selected double buffer the reader also determines if new data has been written to the previously selected double buffer in the time since the previous check to determine if new data had been written to the previously selected double buffer. If new data has been written to the selected double buffer, the reader accesses and outputs the last data written to the previously selected double buffer. If new data has not been written to the selected double buffer, the reader determines if old data or new data was written to the non-selected double buffer. Old data corresponds to data that the reader has previously read. If neither old data nor new data was written to the non-selected double buffer, no data is output by the reader. If old data or new data was written to the non-selected double buffer, the reader accesses and outputs the last data written to the non-selected double buffer.

Alternatively or additionally, the writer writing data to the selected double buffer may include the writer storing data in the low level buffer of the selected double buffer that is most convenient.

Alternatively or additionally, the reader may read data at the same time as the writer writes data to the selected double buffer.

Alternatively or additionally, the reader may output a state. For example, the reader may output a new data state when new data has been written to the selected double buffer. The reader may output the new data state when new data has not been written to the selected double buffer and new data has been written to the non-selected double buffer. The reader may output an old data state when new data has not been written to both the selected double buffer and the non-selected double buffer and the non-selected double buffer contains old data. The reader may output a no data state when new data has not been written to both the selected double buffer and the non-selected double buffer and the non-selected double buffer does not contain old data.

Alternatively or additionally, the reader or writer selecting one of the first double buffer or the second double buffer as the selected double buffer may include the reader setting a transmit index in the shared memory to identify the first double buffer or the second double buffer. The double buffer identified by the transmit index may correspond to the selected double buffer and the double buffer not identified by the transmit index may correspond to an non-selected double buffer.

Alternatively or additionally, the reader or writer may initialize both double buffers to an initial state prior to the reader reading data.

Alternatively or additionally, initializing both double buffers to an initial state may include the reader or writer setting a shared index in the shared memory to an initial value for the first double buffer and the second double buffer. The shared index may identify one of the first low level buffer, the second low level buffer, or the initial value for each double buffer.

Alternatively or additionally, the reader determining if new data has been written to the selected double buffer may include the reader reading the transmit index to identify the selected double buffer and the reader reading the shared index for the selected double buffer. New data may have been written to the selected double buffer if the shared index for the selected double buffer does not correspond to the initial value.

Alternatively or additionally, the reader determining if new data has been written to the selected double buffer may include the reader reading the transmit index to identify the selected double buffer, the reader reading the shared index for the selected double buffer, and the reader reading a read index for the selected double buffer. The read index for a given double buffer may indicate the low level buffer identified by the shared index for the given double buffer from which the reader last accessed data. New data may have been written to the selected double buffer if the shared index for the selected double buffer does not correspond to the read index for the selected double buffer and the shared index for the selected double buffer does not correspond to the initial value.

Alternatively or additionally, if new data has been written to the selected double buffer, the reader may initialize the non-selected double buffer before the reader selects the non-selected double buffer as the selected double buffer.

Alternatively or additionally, the reader initializing the non-selected double buffer may include the reader setting the shared index for the non-selected double buffer to the initial value.

Alternatively or additionally, the reader selecting the non-selected double buffer as the selected double buffer may include the reader updating the transmit index to identify the non-selected double buffer such that the non-selected double buffer is now the selected double buffer and the selected double buffer is now the non-selected double buffer.

The reader determining if new data has been written to the previously selected double buffer in the time since the previous check may include the reader reading the shared index for the previously selected double buffer and the reader setting a read index for the previously selected double buffer in the shared memory to identify the low level buffer identified by the shared index for the non-selected double buffer.

Alternatively or additionally, the reader accessing and outputting the last data written to the previously selected double buffer may include the reader accessing the data stored in the low level buffer identified by the shared index of the previously selected double buffer and the reader outputting the data.

Alternatively or additionally, determining if old data or new data was written to the non-selected double buffer may include the reader reading the shared index for the non-selected double buffer. The non-selected double buffer may not contain old data or new data if the shared index for the non-selected double buffer corresponds to the initial value.

Alternatively or additionally, determining if old data or new data was written to the non-selected double buffer may include, if the shared index for the non-selected double buffer does not correspond to the initial value, the reader comparing the shared index for the non-selected double buffer and the read index for the non-selected double buffer. The non-selected double buffer may contain old data if the shared index for the non-selected double buffer and the read index for the non-selected double buffer correspond to the same low level buffer.

Alternatively or additionally, if the shared index for the non-selected double buffer and the read index for the non-selected double buffer do not correspond to the same low level buffer, new data may have been written to the non-selected double buffer and the reader setting the read index for the non-selected double buffer may identify the low level buffer identified by the shared index for the non-selected double buffer.

Alternatively or additionally, the reader accessing and outputting the last data written to the non-selected double buffer may include the reader accessing the data stored in the low level buffer identified by the shared index of the non-selected double buffer and the reader outputting the data.

Alternatively or additionally, the writer writing data to the selected double buffer may include the writer reading the shared index for the selected double buffer, the writer storing data in a next low level buffer for the selected double buffer, and the writer setting the shared index for the selected double buffer to correspond to the next low level buffer. The next low level buffer may corresponds to the low level buffer for the selected double buffer not indicated by the shared index for the selected double buffer if the shared index corresponds to the first low level buffer or the second low level buffer. The next low level buffer may correspond to the first low level buffer for the selected double buffer if the shared index for the selected double buffer corresponds to the initial value.

Alternatively or additionally, the writer setting the shared index for the selected double buffer to correspond to the next low level buffer may include reading a value of the transmit index (Tx) and determining a corrected transmit index. The transmit index value may be an integer between zero and three. A value of the corrected transmit index may be equal to Tx mod 2. The corrected transmit index having a value of zero may correspond to the selected double buffer being the first double buffer. The corrected transmit index having a value of one may correspond to the selected double buffer being the second double buffer. The writer setting the shared index for the selected double buffer to correspond to the next low level buffer may additionally include reading a value of the shared index (Sx) and determining a corrected shared index. The shared index value may be an integer between zero and four. A value of the corrected shared index may be equal to ((Sx−1) mod 2)+1. The corrected shared index having a value of zero may correspond to the initial value. The corrected shared index having a value of one may correspond to the first low level buffer. The corrected shared index having a value of two may correspond to the second low level buffer. The writer setting the shared index for the selected double buffer to correspond to the next low level buffer may also include determining a value of the next low level buffer and setting the value of the shared index equal to the value of the next low level buffer. The value of the next low level buffer may equal (Sx mod 2)+1 if the transmit index equal zero or one. The value of the next low level buffer may equal (Sx mod 2)+3 if the transmit index equal two or three.

Alternatively or additionally, a computational device may include a multicore processor and a shared memory. The multicore processor may carry out the method for providing deterministic inter-core, inter-process, and inter-thread communication between a reader and a writer by passing data through shared memory using double buffering of double buffers.

Alternatively or additionally, a non-transitory computer-readable storage medium may store logical instructions thereon that when executed by a processor perform the steps of the method for providing deterministic inter-core, inter-process, and inter-thread communication between a reader and a writer by passing data through shared memory using double buffering of double buffers.

The foregoing and other features of the invention are hereinafter fully described and particularly pointed out in the claims, the following description and annexed drawings setting forth in detail certain illustrative embodiments of the invention, these embodiments being indicative, however, of but a few of the various ways in which the principles of the invention may be employed.

Features that are described and/or illustrated with respect to one embodiment may be used in the same way or in a similar way in one or more other embodiments and/or in combination with or instead of the features of the other embodiments.

BRIEF DESCRIPTION OF THE DRAWINGS

FIG. 1 is a block diagram illustrating an exemplary multi-core computational device.

FIG. 2 is a block diagram illustrating a method for providing deterministic inter-core, inter-process, and inter-thread communication between a reader and a writer;

FIGS. 3a-3c are block diagrams illustrating steps for reading data by the reader;

FIG. 4 is a block diagram illustrating steps for writing data by the writer;

FIG. 5 is a block diagram of another embodiment of the method for providing deterministic inter-core, inter-process, and inter-thread communication between a reader and a writer;

FIGS. 6a-6c are block diagrams illustrating steps for reading data by the reader;

FIG. 7 is a block diagram illustrating steps for writing data by the writer;

FIGS. 8a-8b are block diagrams illustrating steps for reading data by the reader; and FIG. 9 is a block diagram illustrating steps for writing data by the writer.

DETAILED DESCRIPTION

Figure 3B:
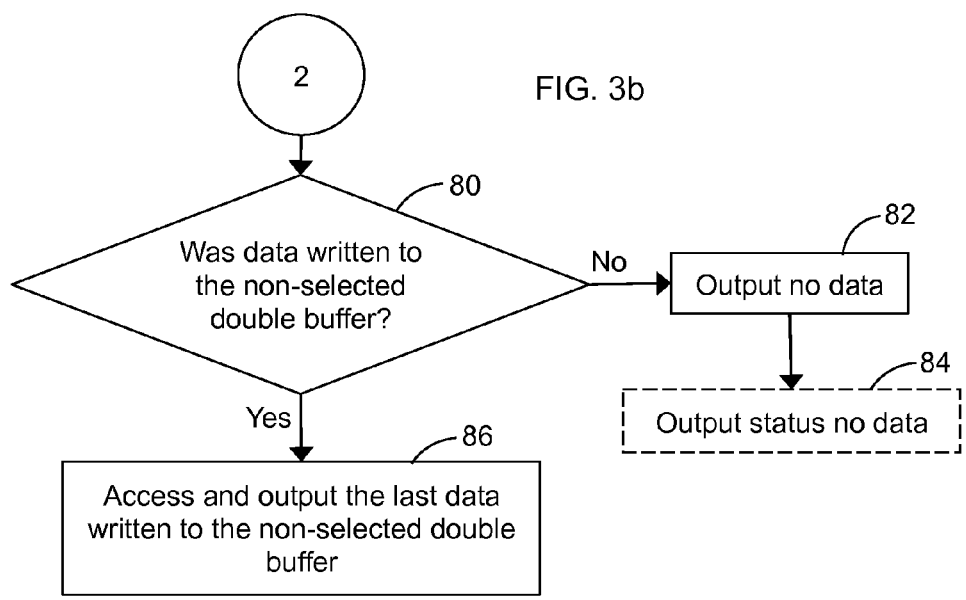

The present invention provides a system and method for providing deterministic inter-core, inter-process, and inter-thread communication between a reader and a writer. The reader and writer communicate by passing data through a shared memory using double buffering of double buffers. The shared memory includes a first double buffer and a second double buffer. Both double buffers include a first low level buffer and a second low level buffer. Using double buffering of the double buffers, both the reader and the writer may simultaneously access (i.e., read and/or write data to) the shared memory.

Turning initially to FIG. 1, an exemplary multi-core computational device 10 is shown. The multi-core computational device 10 includes a multi-core processor 12 and a non-transitory computer-readable storage medium 18. The multi-core processor 12 includes a first core 14 having a reader 15 and a second core 16 having a writer 17. The reader 15 and writer 17 may have read-write access to a shared memory 20 included in the storage medium 18. The shared memory 20 includes a read index 22, a transmit index 24, a shared index 26, a first double buffer 28, and a second double buffer 30. The first double buffer 28 has a first low level buffer 32 and a second low level buffer 34. The second double buffer 30 has a first low level buffer 36 and a second low level buffer 38.

As will be understood by one of ordinary skill in the art, the processor 12 may have various implementations. For example, the processor 12 may include a central processing unit (CPU) or any other suitable multi-core device, such as a programmable circuit, integrated circuit, memory and I/O circuits, an application specific integrated circuit, microcontroller, complex programmable logic device, other programmable circuits, or the like. The processor 12 may also include a non-transitory computer readable memory, such as a CPU cache, computational random access memory (RAM), RAM, or any other suitable memory. Instructions for performing the method described below may be stored in the non-transitory computer readable memory and executed by the processor.

The reader 15 and writer 17 may communicate by passing data through the shared memory 20. Data may be passed through the shared memory 20 by the writer 17 storing (i.e., writing) data in and the reader 15 accessing (i.e., reading) the data stored in the first double buffer 28 and/or the second double buffer 30. That is, the writer 17 writes data to the first low level buffer 32 of the first double buffer 28, the second low level buffer 34 of the first double buffer 28, the first low level buffer 36 of the second double buffer 30, and/or the second low level buffer 38 of the second double buffer 30. When the reader 15 reads data form the shared memory 20, the reader 15 may read the last data written by the writer 17. For example, the writer 17 may write data three times prior to the reader 15 reading data. When the reader 15 reads data, the reader 15 will only read the last data written by the writer 17 (i.e., the reader 15 will not read the data written in the previous two write operations performed by the writer 17).

In order to determine which double buffer 28, 30 to write data to, the writer 17 reads the transmit index 24 to determine a selected double buffer. That is, the selected double buffer may identify either the first double buffers 28 or the second double buffer 30. In order to determine which low level buffer 32, 34, 36, 38 of the selected double buffer to write data, the writer 17 reads the shared index 26. That is, the shared index 26 may identify the first low level buffer 32, 36 or the second low level buffer 34, 38 of the selected double buffer. The shared index 26 may identify, for a given double buffer 32, 34, the low level buffer to which data was last written. Similarly, the reader 15 also reads the transmit index 24 to determine the selected double buffer for reading data and the shared index 26 to determine which low level buffer 32, 34, 36, 38 of the selected double buffer to read data from.

Accordingly, the reader 15 may have read-write access to the read index 22 and the transmit index 24. The reader 15 may have read only access to the first double buffer 32 and the second double buffer 34. The reader 15 may also have read-write access or read only access to the shared index 26. The writer 17 may have read-write access to the shared index 26, the first double buffer 32, and the second double buffer 34. The writer 17 may have read only access to the transmit index 24.

The read and write operations should be atomic, i.e. performed without interrupt. That is, as implemented, the processor 12 and the shared memory 20 should be configured such that access to the transmit index 24 and the shared index 26 occurs atomically.

As will be understood by one of ordinary skill in the art, the storage medium 18 may include a non-transitory computer readable medium, such as random access memory (RAM), a read-only memory (ROM), an erasable programmable read-only memory (EPROM or Flash memory), or any other suitable medium. Instructions for performing the method described below may be stored in the non-transitory computer readable medium and executed by the processor.

With reference to FIG. 2, a block diagram depicting a method for providing deterministic inter-core, inter-process, and inter-thread communication between a reader 15 and a writer 17 is shown. In process block 50 a double buffer is selected for storing data. That is, the reader 15 or writer 17, e.g., may select either the first double buffer 28 or the second double buffer 30 as the selected double buffer. In process block 52, both the first double buffer 28 and the second double buffer 30 are initialized. The reader 15, prior to reading data, may perform initialization of the double buffers 28, 30.

Following process block 52, decision blocks 54 and 58 may occur simultaneously. That is, the reader 15 may read data at the same time as the writer 17 writes data. In decision block

54, a check is performed to determine if data is to be written. If data is to be written, then, in process block 56, the writer 17 writes data. For example, the writer 17 may store data in the low level buffer of the selected double buffer that is most convenient. In decision block 58, a check is performed to determine if there data is to be read. If data is to be read, then, in process block 60, the reader 15 reads data.

Turning to FIG. 3a, reading data by the reader 15 is further described. In decision block 62, a check is performed to determine if new data has been written to the selected double buffer. New data is data that has not previously been read by the reader 15. In block 64, if new data has been written to the selected double buffer, the reader 15 may, e.g., initialize the non-selected double buffer. Initializing a double buffer 28, 30, e.g., is further described in process block 103 of FIG. 5. Next, in process block 66, the reader 15, e.g., selects the non-selected double buffer as the selected double buffer, such that the writer 17 will now write data to the newly selected double buffer.

In process block 68, the reader 15 determines if new data has been written to the previously selected double buffer in the time since the previous check (i.e., process block 62). In process block 70, the reader 15 reads and outputs the last data written to the previously selected double buffer. In process block 72, the reader 15 optionally outputs a status of new data (i.e., when new data has been written to the selected double buffer).

The following example is provided to demonstrate the operation of FIG. 3a. In this example, the reader 15 has received an instruction to read the last data written to the shared memory 20. Assume, at the time block 62 is performed, the selected double buffer is the first double buffer 28 and the writer 17 has previously written data to the first low level buffer 32 of the selected double buffer, but data has not been written to the second low level buffer 34. Following decision block 62, because data has been written to the selected double buffer, process block 64 is performed. In process block 64, the non-selected double buffer (i.e., the second double buffer 30) is initialized. In process block 66, the second double buffer 30 (i.e., the non-selected double buffer) is selected as the selected double buffer. Now, following process block 66, if the writer 17 writes new data to the shared memory 20, the writer 17 will write data to the newly selected double buffer, not the double buffer from which the reader 15 is reading data (i.e., the previously selected double buffer).

Continuing the example, in process block 68, the reader 15 determines if new data has been written to the previously selected double buffer (i.e., the first double buffer 28) since process block 62. As stated above, at the time process block 62 was performed, data had been written to the first low level buffer 32 of the first double buffer 28, but no data had been written to the second low level buffer 34. However, during operation of blocks 62 and 64, in this example, the writer 17 wrote new data to the second low level buffer 34 of the first double buffer 32 (i.e., the selected double buffer at the time). If process block 68 is not performed (i.e., the reader 15 does not check if new data has been written to the previously selected double buffer during operation of steps 64 and 66), then the reader 15 may incorrectly read old data (in this example the data stored in the first low level buffer 32) and miss the new data that was written to the shared memory 20 during operation of blocks 62 and 64 (in this example the data stored in the second low level buffer 34). The reading of old data as opposed to the new data may make the method non-deterministic and cause errors.

Returning to FIGS. 3a and 3b, if new data has not been written to the selected double buffer, then decision block 80 of FIG. 3b is performed. In decision block 80, the reader 15 determines if old data or new data was written to the non-selected double buffer. Old data corresponds to data that the reader 15 has previously read. If neither old data nor new data was written to the non-selected double buffer, then, in process block 82, no data is output by the reader 15. Following process block 82 (i.e., when new data has not been written to both the selected double buffer and the non-selected double buffer does not contain old data), in process block 84, a status no data may optionally be output.

In process block 86, if old data or new data was written to the non-selected double buffer, the reader 15 accesses and outputs the last data written to the non-selected double buffer. Accessing and outputting the last data written to the non-selected double buffer in process block 86 is further described in FIG. 3c.

Figure 3C:
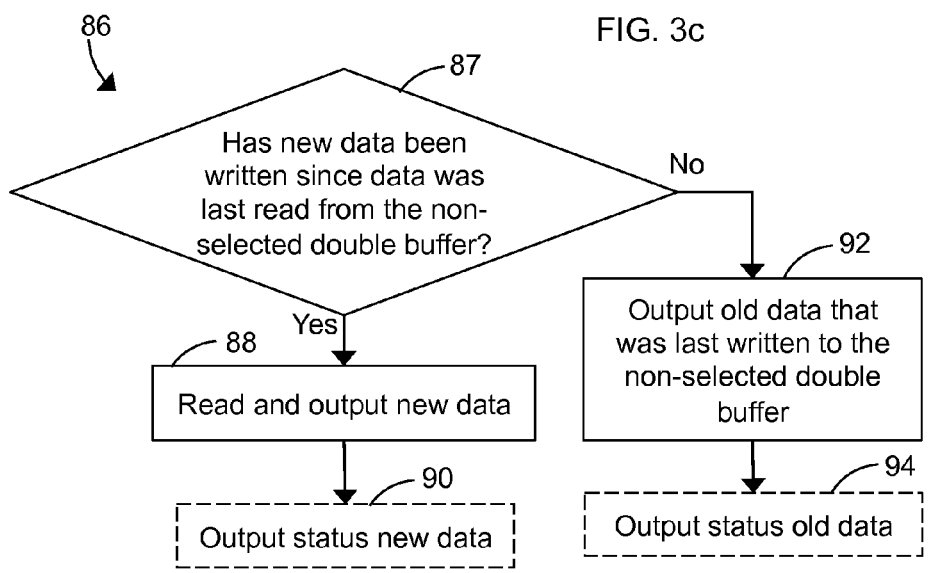

With reference to FIG. 3c, decision block 87 determines if new data been written to the shared memory 20 since data was last read from the non-selected double buffer. If new data has been written, then, in process block 88, the reader 15 reads and outputs the new data. In process block 90 (i.e., when new data has not been written to the selected double buffer and new data has been written to the non-selected double buffer), the reader 15 optionally outputs the status new data. If new data has not been written, then, in process block 92, the reader 15 outputs the old data that was last written to the non-selected double buffer. In process block 94 (i.e., when new data has not been written to both the selected double buffer and the non-selected double buffer and the non-selected double buffer contains old data), the reader 15 may optional output the status old data.

Turning to FIG. 4, the writer 17 writing data in process block 56 of FIG. 2 is further described. In decision block 95, the writer 17 determines if data has been written to the selected double buffer. If data has not been written to the selected double buffer, then, in process block 96 the writer 17 writes data to either of the low level buffers of the selected double buffer. For example, the writer 17 may write data to the low level buffer of the selected double buffer that is most convenient. The most convenient low level buffer may comprise the first low level buffer, the second low level buffer, the last low level buffer to which data was written, the low level buffer that data was not written to last, the low level buffer with the shortest access time, or any other suitable criteria for selecting the most convenient low level buffer. If data has been written to the selected double buffer, then, in process block 98, the writer 17 writes data to the low level buffer of the selected double buffer that does not contain data or that contains the oldest data.

With reference to FIG. 5, a block diagram depicting an alternative embodiment of the method for providing deterministic inter-core, inter-process, and inter-thread communication between the reader 15 and the writer 17 is shown. In process block 102, the reader 15 sets the transmit index 24 to identify either the first double buffer 28 or the second double buffer 30. The double buffer 28, 30 identified by the transmit index 24 corresponds to the selected double buffer. The double buffer not identified by the transmit index corresponds to an non-selected double buffer. For example, if the transmit index 24 contains the value zero, the first double buffer 28 may be the selected double buffer and the second double buffer 30 may be the non-selected double buffer. Alternatively, if the transmit index 24 contains the value one, the second double buffer 30 may be the selected double buffer and the first double buffer 28 may be the non-selected double buffer.

In process block 103, the reader 15 or writer 17 sets the shared index 26 to an initial value for the first double buffer 28 and the second double buffer 30. The shared index 26 may identify, for each double buffer, one of the first low level buffer 32, 36, the second low level buffer 34, 38, or the initial value. For example, the shared index 26 may take the form of a two element array, the first element of the array may correspond to the first double buffer 28 and the second element of the array may correspond to the second double buffer 30 (i.e., the shared index 26 may take the form [first double buffer 28, second double buffer 30]). In this example, upon initialization, the shared index 26 may correspond to [0,0]. If, e.g., the shared index 26 corresponds to [2,1], then the shared index 26 identifies the second low level buffer 34 for the first double buffer 28 and the first low level buffer 36 for the second double buffer 30. That is, for the shared index 26, a value of one may correspond to the first low level buffer 32, 36 and a value of two may correspond to the second low level buffer 34, 38.

As described above and in further detail in FIG. 7, the shared index 26 may identify the low level buffer of the selected double buffer to which data was last written. Both the reader 15 and the writer 17 use the shared index 26 to determine which low level buffer of the selected double buffer to respectively read and write data. As the writer 17 writes data to the selected double buffer, the writer 17 may update the shared index 26 to identify the low level buffer of the selected double buffer to which data was written. Thus, if the shared index 26 has a value of zero (i.e., the initial value), then the writer 17 has not written data to the selected double buffer, because, if the writer 17 had written data to the selected double buffer, the shared index 26 would have been updated to identify the low level buffer of the selected double buffer to which data was written.

Returning to FIG. 5, following process block 103, decision blocks 104 and 108 may occur simultaneously. That is, the reader 15 may read data at the same time as the writer 17 writes data. In decision block 104, a check is performed to determine if data is to be written. If data is to be written, then, in process block 106, the writer 17 writes data. For example, the writer 17 may store data in the low level buffer of the selected double buffer that is most convenient. In decision block 108, a check is performed to determine if there data is to be read. If data is to be read, then, in process block 110, the reader 15 reads data.

Turning to FIGS. 6a-6c, reading data by the reader 15 is further described. In process block 130, the reader 15 reads the transmit index 24 to identify the selected double buffer. Next, in process block 132, the reader 15 reads the shared index 26 for the selected double buffer. In decision block 134, new data has been written to the selected double buffer if the shared index 26 for the selected double buffer does not correspond to the initial value. If the shared index 26 for the selected double buffer does not correspond to the initial value, the method progresses to process block 140 of FIG. 6b.

With reference to FIG. 6b, in process block 140, the reader 15 initializes the non-selected double buffer, i.e., the reader 15 may set the shared index 26 for the non-selected double buffer to the initial value. In process block 142, the reader 15 updates the transmit index 24 to identify the non-selected double buffer such that the non-selected double buffer is now the selected double buffer and the selected double buffer is now the non-selected double buffer (i.e., the previously selected double buffer). Thus, the writer 17 will now write data to the newly selected double buffer.

In process block 144, the reader 15 determines if new data has been written to the previously selected double buffer in the time since decision block 132. In process block 144, the reader 15 again reads the shared index 26 for the previously selected double buffer (identifying the low level buffer of the previously selected double buffer to which data was last written). Thus, without step 144, if the writer 17 had written data to the previously selected double buffer during operation of steps 140 and 142, the reader 15 would have incorrectly read the old data stored in the low level buffer identified by the shared index 26 in step 132. However, by again reading the shared index 26 in step 144, the reader 15 will correctly read the last data written by the writer 17 to the previously selected double buffer.

In process block 146, the reader 15 sets the read index 22 for the previously selected double buffer in the shared memory 20 to identify the low level buffer identified by the shared index 26 for the previously selected double buffer. The read index 22, for a given double buffer, indicates the low level buffer identified by the shared index 26 for the given double buffer from which the reader 15 last accessed data. For example, the read index 22 may take the form of a two element array, the first element of the array corresponding to the first double buffer 28 and the second element of the array corresponding to the second double buffer 30 (i.e., the read index 22 may take the form [first double buffer 28, second double buffer 30]). In this example, assuming the reader 15 has not yet read data from the shared memory 20, the read index 22 corresponds to [0,0]. If the reader 15 reads from the second low level buffer 34 of the first double buffer 28, the read index 22 may be updated to correspond to [2,0], indicating, for the first double buffer 28, the reader 15 last read data from the second low level buffer 34.

In the combination of process blocks 148 and 150, the reader 15 accesses and outputs the last data written to the previously selected double buffer. In process block 148, the reader 15 accesses (i.e., reads) the data stored in the low level buffer identified by the shared index 26 of the previously selected double buffer. In process block 150, the reader 15 outputs the data. In process block 152, the reader 15 optionally outputs the status new data.

Turning to FIGS. 6a and 6c, in decision block 134 of FIG. 6a, if the shared index 26 for the selected double buffer corresponds to the initial value, the method progresses to process block 160 of FIG. 6c. In the combination of blocks 160 and 162, the reader 15 determines if old data or new data was written to the non-selected double buffer. In process block 160, the reader 15 reads the shared index 26 for the non-selected double buffer. In decision block 162, the reader 15 determines if the shared index of the non-selected double buffer corresponds to the initial value. The non-selected double buffer does not contain old data or new data if the shared index for the non-selected double buffer corresponds to the initial value.

In decision block 162, if the shared index 26 of the non-selected double buffer corresponds to the initial value, then, in process block 164, the reader 15 outputs no data. In process block 166, the reader 15 optionally outputs the status no data.

Alternatively, in decision block 162, if the shared index 26 of the non-selected double buffer does not correspond to the initial value (indicating data has been written to the non-selected double buffer), the reader 15 determines if old data or new data was written to the non-selected double buffer. Determining if old data or new data was written to the non-selected double buffer includes, in decision block 168, the reader 15 comparing the shared index 26 for the non-selected double buffer and the read index 22 for the non-selected double buffer. The non-selected double buffer contains old data if the shared index 26 for the non-selected double buffer and the read index 22 for the non-selected double buffer correspond to the same low level buffer. That is, because the read index 22 indicates the low level buffer from which the reader 15 last read data and the shared index 26 indicates the low level buffer from which the writer 17 last wrote data, if the low level buffer that the writer 17 last wrote data to (i.e., the shared index 26) is the same as the low level buffer that the reader 15 last read data from (i.e., the read index 22), then new data has not been written to the non-selected double buffer. Alternatively, if the shared index 26 for the non-selected double buffer and the read index 22 for the non-selected double buffer do not correspond to the same low level buffer, then new data was written to the non-selected double buffer.

In process block 170, if the shared index 26 for the non-selected double buffer and the read index 22 for the non-selected double buffer correspond to the same low level buffer, the reader 15 accesses (i.e., reads) the data stored in the low level buffer identified by the shared index 26 of the non-selected double buffer. In process block 172, the reader 15 outputs the data. In process block 174, the reader 15 optionally outputs the status old data.

In process block 176, if the shared index 26 for the non-selected double buffer and the read index 22 for the non-selected double buffer do not correspond to the same low level buffer, the reader 15 sets the read index 22 for the non-selected double buffer to identify the low level buffer identified by the shared index 26 for the non-selected double buffer. In process block 178, the reader 15 accesses (i.e., reads) the data stored in the low level buffer identified by the shared index 26 of the non-selected double buffer. In process block 180, the reader 15 outputs the data. In process block 182, the reader 15 optionally outputs the status new data.

Turning to FIG. 7, the writer 17 writing data, e.g., to the selected double buffer in process block 106 of FIG. 5 is further described. In process block 190, the writer 17 reads the transmit index 24 to determine the selected double buffer. In process block 192, the writer 17 reads the shared index 26 for the selected double buffer. As described previously, the shared index 26 identifies the low level buffer to which data was last written. In process block 194, the writer 17 determines a next low level buffer for the selected double buffer. The next low level buffer identifies a low level buffer for the selected double buffer to which the writer 17 will write new data. If the shared index 26 corresponds to the first low level buffer or the second low level buffer, the next low level buffer may correspond to the low level buffer for the selected double buffer not indicated by the shared index 26 for the selected double buffer. If the shared index 26 for the selected double buffer corresponds to the initial value, the next low level buffer may correspond to the first low level buffer for the selected double buffer. In process block 196, the writer 17 stores (i.e., writes) data in the next low level buffer for the selected double buffer. In process block 198, the writer 17 sets the shared index 26 for the selected double buffer to correspond to the next low level buffer.

The following example is provided to demonstrate the operation of FIG. 7. In this example, assume the selected double buffer is the first double buffer 28 and that the writer 17 has written data to the first low level buffer 32 since the reader 15 last read data. Thus, in this example, the transmit index 24 identifies the first double buffer 28 as the selected double buffer and the shared index 26 identifies the first low level buffer 32 of the first double buffer 28. Assuming the writer 17 receives another write instruction, in process blocks 190 and 192, the writer 17 reads the transmit index 24 and shared index 26. Prior to writing data, in process block 194, the writer 17 determines the next low level buffer to which data will be written. In this example, because data was last written to the first low level buffer 32 of the first double buffer 28, the next low level buffer is determined to be the second low level buffer 32 of the first double buffer 28. After writing the data to the next low level buffer in process block 196, the writer 17 sets the shared index 26 for the first double buffer 28 (i.e., the selected double buffer) to correspond to the second low level buffer 32 (i.e., the next low level buffer).

In this example, if further write instructions are received, the writer 17 may alternate writing data between the first low level buffer 32 and the second low level buffer 34 of the selected double buffer (i.e., the first double buffer 28) until the reader 15 begins a read operation.

Figure 8B:
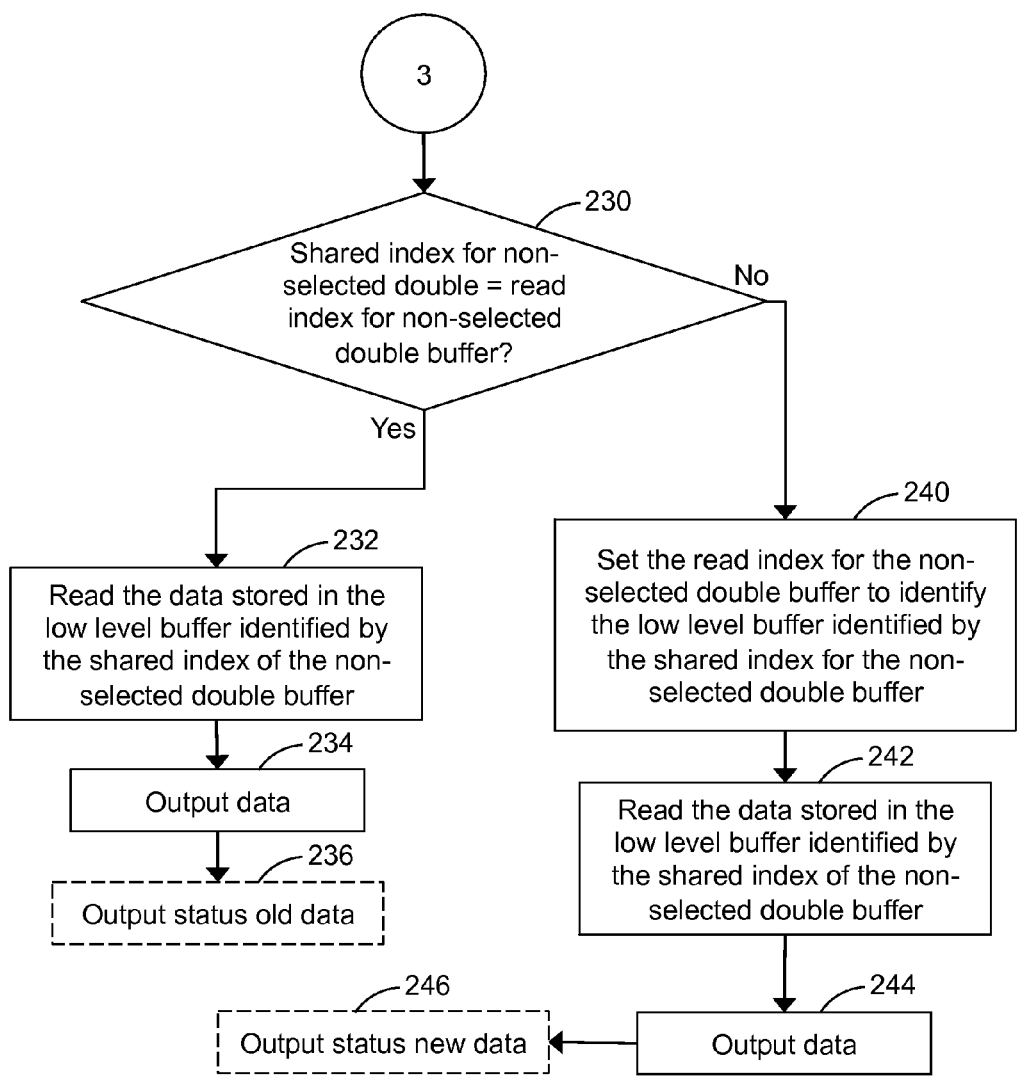

Turning to FIGS. 6a, 8a, and 8b, in an alternative embodiment, in decision block 134 (FIG. 6a), if the shared index 26 for the selected double buffer does not correspond to the initial value, the method may progress to process block 200 (FIG. 8a). In this embodiment, the reader 15 may have only read access to the shared index 26. Thus, as opposed to the processes described in FIGS. 6b and 6c, following decision block 134, the reader 15 does not set the shared index 26 for either double buffer 28, 30 to the initial value. This may prevent a conflict caused by the reader 15 and writer 17 attempting to write to the shared index 26 at the same time.

In process block 200, the reader 15 reads the shared index 26 for the selected double buffer. In decision block 202, a check is performed to determine if the shared index 26 for the selected double buffer corresponds to the read index 22 for the selected double buffer. If the shared index 26 for the selected double buffer does not correspond to the read index 22 for the selected double buffer, new data has been written to the selected double buffer. If new data has been written to the selected double buffer, the method progresses to process block 204.

In process block 204, the reader 15 updates the transmit index 24 to identify the non-selected double buffer such that the non-selected double buffer is now the selected double buffer and the selected double buffer is now the non-selected double buffer (i.e., the previously selected double buffer).

In process block 206, the reader 15 determines if new data has been written to the previously selected double buffer in the time since decision block 200. In process block 206, the reader 15 again reads the shared index 26 for the previously selected double buffer (identifying the low level buffer of the previously selected double buffer to which data was last written). Thus, without step 206, if the writer 17 had written data to the previously selected double buffer during operation of steps 202 and 204, the reader 15 would have incorrectly read the old data stored in the low level buffer identified by the shared index 26 in step 200. However, by again reading the shared index 26 in step 206, the reader 15 will correctly read the last data written by the writer 17 to the previously selected double buffer.

In process block 208, the reader 15 sets the read index 22 for the previously selected double buffer in the shared memory 20 to identify the low level buffer identified by the shared index 26 for the previously selected double buffer. As described previously, the read index 22, for a given double buffer, indicates the low level buffer identified by the shared index 26 for the given double buffer from which the reader 15 last accessed data.

In the combination of process blocks 210 and 212, the reader 15 accesses and outputs the last data written to the previously selected double buffer. In process block 210, the reader 15 accesses (i.e., reads) the data stored in the low level buffer identified by the shared index 26 of the previously selected double buffer. In process block 212, the reader 15 outputs the data. In process block 214, the reader 15 optionally outputs the status new data.

Returning to decision block 202, if the shared index 26 for the selected double buffer corresponds to the read index 22 for the selected double buffer, new data has not been written to the selected double buffer. If new data has not been written to the selected double buffer, the method progresses to process block 216 to determine if old data or new data was written to the non-selected double buffer.

Determining if old data or new data was written to the non-selected double buffer includes, in process block 216, the reader 15 reading the shared index 26 for the non-selected double buffer. In decision block 230 (FIG. 8*b*), the reader 15 compares the shared index 26 for the non-selected double buffer and the read index 22 for the non-selected double buffer. The non-selected double buffer contains old data if the shared index 26 for the non-selected double buffer and the read index 22 for the non-selected double buffer correspond to the same low level buffer. That is, because the read index 22 indicates the low level buffer from which the reader 15 last read data and the shared index 26 indicates the low level buffer from which the writer 17 last wrote data, if the low level buffer that the writer 17 last wrote data to (i.e., the shared index 26) is the same as the low level buffer that the reader 15 last read data from (i.e., the read index 22), then new data has not been written to the non-selected double buffer. Alternatively, if the shared index 26 for the non-selected double buffer and the read index 22 for the non-selected double buffer do not correspond to the same low level buffer, then new data was written to the non-selected double buffer.

In process block 232, if the shared index 26 for the non-selected double buffer and the read index 22 for the non-selected double buffer correspond to the same low level buffer, the reader 15 accesses (i.e., reads) the data stored in the low level buffer identified by the shared index 26 of the non-selected double buffer. In process block 234, the reader 15 outputs the data. In process block 236, the reader 15 optionally outputs the status old data.

In process block 240, if the shared index 26 for the non-selected double buffer and the read index 22 for the non-selected double buffer do not correspond to the same low level buffer, the reader 15 sets the read index 22 for the non-selected double buffer to identify the low level buffer identified by the shared index 26 for the non-selected double buffer. In process block 242, the reader 15 accesses (i.e., reads) the data stored in the low level buffer identified by the shared index 26 of the non-selected double buffer. In process block 244, the reader 15 outputs the data. In process block 246, the reader 15 optionally outputs the status new data.

Turning to FIG. 9, the writer 17 writing data to the selected double buffer in process block 106 of FIG. 5 is further described. In process block 260, the writer 17 reads the transmit index 24. The value of the transmit index 24 (Tx) may be an integer between zero and three. In process block 262, to determine the selected double buffer, the writer 17 determines a corrected transmit index 14. The value of the corrected transmit index may be equal to Tx mod 2. The corrected transmit index having a value of zero may correspond to the selected double buffer being the first double buffer 28 and the corrected transmit index 24 having a value of one may correspond to the selected double buffer being the second double buffer 30.

The modulus operator (i.e., mod), e.g., may operate according to the modulus operator in the ADA95 language or the C language. The sign of the output of the modulus operator may be machine-dependent for negative operands. For example, the modulus operator may operate as described in Kernighan Brian, W., and M. Ritchie Dennis, "The C programming language," Second Edition, AT&T Bell laboratories, New Jersey, Prentice Hall (1988), the entire contents of which are incorporated by reference herein.

In process block 264, the writer 17 reads the shared index 26 for the selected double buffer. The value of the shared index 26 (Sx) may be an integer between zero and four. In process block 266, the writer 17 determines a corrected shared index to determine the low level buffer of the selected buffer to which data was last written. The value of the corrected shared index may be equal to $((Sx-1) \bmod 2)+1$. The corrected shared index having a value of zero may correspond to the initial value, the corrected shared index having a value of one may correspond to the first low level buffer, and the corrected shared index having a value of two may correspond to the second low level buffer.

In process block 268, the writer 17 determines a next low level buffer for the selected double buffer. The next low level buffer may be determined such that, if the transmit index 24 equals zero or one, the value of the next low level buffer equals $(Sx \bmod 2)+1$. If the transmit index 24 equals two or three, the value of the next low level buffer may equal $(Sx \bmod 2)+3$. In process block 270, the writer 17 stores (i.e., writes) data in the next low level buffer for the selected double buffer. In process block 272, the writer 17 sets the value of the shared index 26 equal to the value of the next low level buffer.

Although the invention has been shown and described with respect to a certain illustrated embodiment or embodiments, equivalent alterations and modifications will occur to others skilled in the art upon reading and understanding the specification and the annexed drawings. In particular regard to the various functions performed by the above described integers (components, assemblies, devices, compositions, etc.), the terms (including a reference to a "means") used to describe such integers are intended to correspond, unless otherwise indicated, to any integer which performs the specified function (i.e., that is functionally equivalent), even though not structurally equivalent to the disclosed structure which performs the function in the herein illustrated embodiment or embodiments of the invention.

What is claimed is:

1. A method for providing deterministic inter-core, inter-process, and inter-thread communication between a reader and a writer by passing data through shared memory using double buffering of double buffers, the method comprising:
    the reader or writer selecting one of a first double buffer or a second double buffer as a selected double buffer, wherein the writer writes data to the selected double buffer, each double buffer is stored in the shared memory, and each double buffer comprises a first low level buffer and a second low level buffer;
    the reader reading data, wherein reading data comprises:
        the reader determining if new data has been written to the selected double buffer, wherein new data corresponds to data that has not been read by the reader;
        if new data has been written to the selected double buffer:
            the reader selecting the non-selected double buffer as the selected double buffer such that the writer writes data to the newly selected double buffer;
            the reader determining if new data has been written to the previously selected double buffer in the time since the previous check to determine if new data had been written to the previously selected double buffer;

the reader accessing and outputting the last data written to the previously selected double buffer;

if new data has not been written to the selected double buffer:

the reader determining if old data or new data was written to the non-selected double buffer, wherein old data corresponds to data that the reader has previously read;

if neither old data nor new data was written to the non-selected double buffer, no data is output by the reader; and if old data or new data was written to the non-selected double buffer, the reader accessing and outputting the last data written to the non-selected double buffer.

2. The method of claim 1, wherein the writer writing data to the selected double buffer comprises the writer storing data in the low level buffer of the selected double buffer that is most convenient.

3. The method of claim 1, wherein the reader reads data at the same time as the writer writes data to the selected double buffer.

4. The method of claim 1, further comprising the reader outputting a state, wherein:

the reader outputs a new data state when new data has been written to the selected double buffer;

the reader outputs the new data state when new data has not been written to the selected double buffer and new data has been written to the non-selected double buffer;

the reader outputs an old data state when new data has not been written to both the selected double buffer and the non-selected double buffer and the non-selected double buffer contains old data; and the reader outputs a no data state when new data has not been written to both the selected double buffer and the non-selected double buffer and the non-selected double buffer does not contain old data.

5. The method of claim 1, wherein the reader or writer selecting one of the first double buffer or the second double buffer as the selected double buffer comprises:

the reader setting a transmit index in the shared memory to identify the first double buffer or the second double buffer, wherein the double buffer identified by the transmit index corresponds to the selected double buffer and the double buffer not identified by the transmit index corresponds to an non-selected double buffer.

6. The method of claim 5, further comprising the reader or writer initializing both double buffers to an initial state prior to the reader reading data.

7. The method of claim 6, wherein initializing both double buffers to an initial state comprises:

the reader or writer setting a shared index in the shared memory to an initial value for the first double buffer and the second double buffer, wherein the shared index identifies one of the first low level buffer, the second low level buffer, or the initial value for each double buffer.

8. The method of claim 7, wherein the reader determining if new data has been written to the selected double buffer comprises:

the reader reading the transmit index to identify the selected double buffer;

the reader reading the shared index for the selected double buffer; and wherein new data has been written to the selected double buffer if the shared index for the selected double buffer does not correspond to the initial value.

9. The method of claim 7, wherein the reader determining if new data has been written to the selected double buffer comprises:

the reader reading the transmit index to identify the selected double buffer;

the reader reading the shared index for the selected double buffer;

the reader reading a read index for the selected double buffer, wherein the read index for a given double buffer indicates the low level buffer identified by the shared index for the given double buffer from which the reader last accessed data; and wherein new data has been written to the selected double buffer if the shared index for the selected double buffer does not correspond to the read index for the selected double buffer and the shared index for the selected double buffer does not correspond to the initial value.

10. The method of claim 8, further comprising, if new data has been written to the selected double buffer, the reader initializing the non-selected double buffer before the reader selecting the non-selected double buffer as the selected double buffer.

11. The method of claim 10, wherein the reader initializing the non-selected double buffer comprises:

the reader setting the shared index for the non-selected double buffer to the initial value.

12. The method of claim 7, wherein the reader selecting the non-selected double buffer as the selected double buffer comprises:

the reader updating the transmit index to identify the non-selected double buffer such that the non-selected double buffer is now the selected double buffer and the selected double buffer is now the non-selected double buffer.

13. The method of claim 12, wherein the reader determining if new data has been written to the previously selected double buffer in the time since the previous check comprises:

the reader reading the shared index for the previously selected double buffer; and the reader setting a read index for the previously selected double buffer in the shared memory to identify the low level buffer identified by the shared index for the non-selected double buffer.

14. The method of claim 13, wherein the reader accessing and outputting the last data written to the previously selected double buffer comprises:

the reader accessing the data stored in the low level buffer identified by the shared index of the previously selected double buffer; and the reader outputting the data.

15. The method of claim 11, wherein determining if old data or new data was written to the non-selected double buffer comprises:

the reader reading the shared index for the non-selected double buffer; and wherein the non-selected double buffer does not contain old data or new data if the shared index for the non-selected double buffer corresponds to the initial value.

16. The method of claim 15, wherein determining if old data or new data was written to the non-selected double buffer further comprises:

if the shared index for the non-selected double buffer does not correspond to the initial value:

the reader comparing the shared index for the non-selected double buffer and the read index for the non-selected double buffer; and wherein the non-selected double buffer contains old data if the shared index for the non-selected double buffer and the read index for the non-selected double buffer correspond to the same low level buffer.

17. The method of claim 16, wherein determining if old data or new data was written to the non-selected double buffer further comprises:

wherein, if the shared index for the non-selected double buffer and the read index for the non-selected double buffer do not correspond to the same low level buffer:

new data was written to the non-selected double buffer; and the reader setting the read index for the non-selected double buffer to identify the low level buffer identified by the shared index for the non-selected double buffer.

18. The method of claim 7, wherein the reader accessing and outputting the last data written to the non-selected double buffer comprises:

the reader accessing the data stored in the low level buffer identified by the shared index of the non-selected double buffer; and the reader outputting the data.

19. The method of claim 7, the writer writing data to the selected double buffer comprises:

the writer reading the shared index for the selected double buffer;

the writer storing data in a next low level buffer for the selected double buffer, wherein (1) the next low level buffer corresponds to the low level buffer for the selected double buffer not indicated by the shared index for the selected double buffer if the shared index corresponds to the first low level buffer or the second low level buffer and (2) the next low level buffer corresponds to the first low level buffer for the selected double buffer if the shared index for the selected double buffer corresponds to the initial value; and the writer setting the shared index for the selected double buffer to correspond to the next low level buffer.

20. The method of claim 19, wherein the writer setting the shared index for the selected double buffer to correspond to the next low level buffer comprises:

reading a value of the transmit index (Tx), wherein the transmit index value is an integer between zero and three;

determining a corrected transmit index, wherein a value of the corrected transmit index is equal to Tx mod 2, the corrected transmit index having a value of zero corresponds to the selected double buffer being the first double buffer, and the corrected transmit index having a value of one corresponds to the selected double buffer being the second double buffer;

reading a value of the shared index (Sx), wherein the shared index value is an integer between zero and four;

determining a corrected shared index, wherein a value of the corrected shared index is equal to $((Sx-1) \bmod 2)+1$, the corrected shared index having a value of zero corresponds to the initial value, the corrected shared index having a value of one corresponds to the first low level buffer, and the corrected shared index having a value of two corresponds to the second low level buffer;

determining a value of the next low level buffer, wherein the value of the next low level buffer equals (Sx mod 2)+1 if the transmit index equal zero or one and the value of the next low level buffer equals (Sx mod 2)+3 if the transmit index equal two or three; and setting the value of the shared index equal to the value of the next low level buffer.

21. A computational device comprising a multicore processor and a shared memory, the multicore processor carrying out the method of claim 1.

22. A non-transitory computer-readable storage medium storing logical instructions thereon that when executed by a processor perform the steps of the method of claim 1.

* * * * *